(No Model.)

T. SEAMAN.
WAGON GEARING.

No. 272,908. Patented Feb. 27, 1883.

Witnesses.
A. Edmunds.
Carl Hayden

Inventor.
Thomas Seaman.
By P. J. Edmunds
Attorney.

UNITED STATES PATENT OFFICE.

THOMAS SEAMAN, OF LISTOWELL, ONTARIO, CANADA.

WAGON-GEARING.

SPECIFICATION forming part of Letters Patent No. 272,908, dated February 27, 1883.

Application filed August 21, 1882. (No model.)

*To all whom it may concern:*

Be it known that I, THOMAS SEAMAN, manufacturer, a subject of the Queen of Great Britain, residing at the town of Listowell, in the county of Perth, in the Province of Ontario, Canada, have invented certain new and useful Improvements on Wagon-Gearing, of which the following is a specification.

This invention consists of the combination, with an axle provided with mortises, of a socket-bracket provided with tenons, which tenons are rigidly secured in the mortises in the said axle, and bolts for securing the reach and tongue to the brackets, and also bolts for securing the brackets to the axles, in such a manner that this interlocking of the tenons of the brackets in the mortises of the axles takes the side strain and wear off the bolts which secure the brackets and the axles together; and this invention also consists of the combination, with skeins provided with lugs, of a double truss-rod and bolts or staples for securing the truss-rod to the axle about midway between the skeins, so as to have the drop of the truss-rod at the end of the skein on the axle, which gives the greatest strength to the part where axles usually break; and this invention consists, further, of a stake provided with lugs and clevis for securing an extension-bar to the stake to extend the height of the stake when required, and also of providing this stake with tenon, bolts, and flange for securing the stake to the bolster, provided with a mortise into which the tenon of the stake is rigidly secured.

The construction and operation will be more particularly explained with reference to the accompanying drawings, and to the letters or figures of reference marked thereon, which form a part of this specification, wherein—

Figure 1:
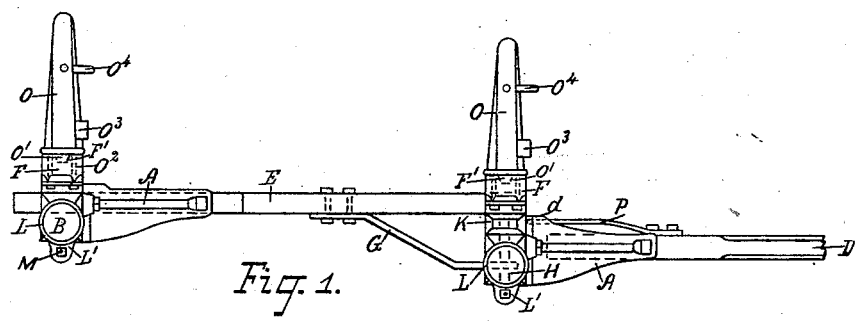
Figure 2:
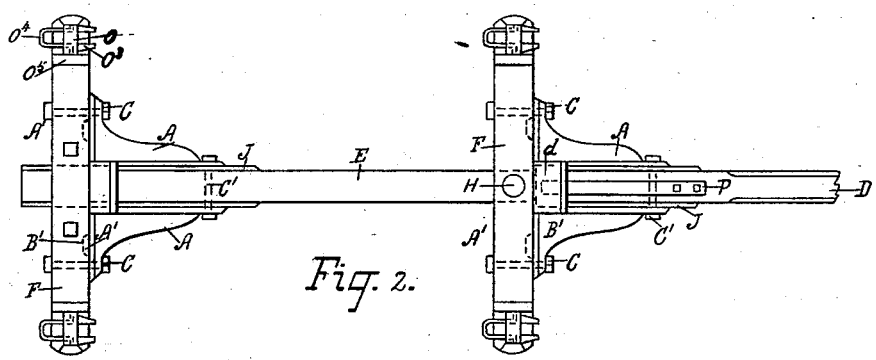
Figure 4:
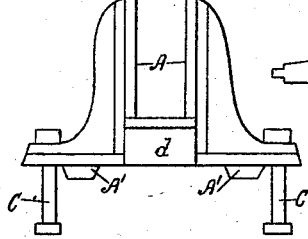
Figure 3:
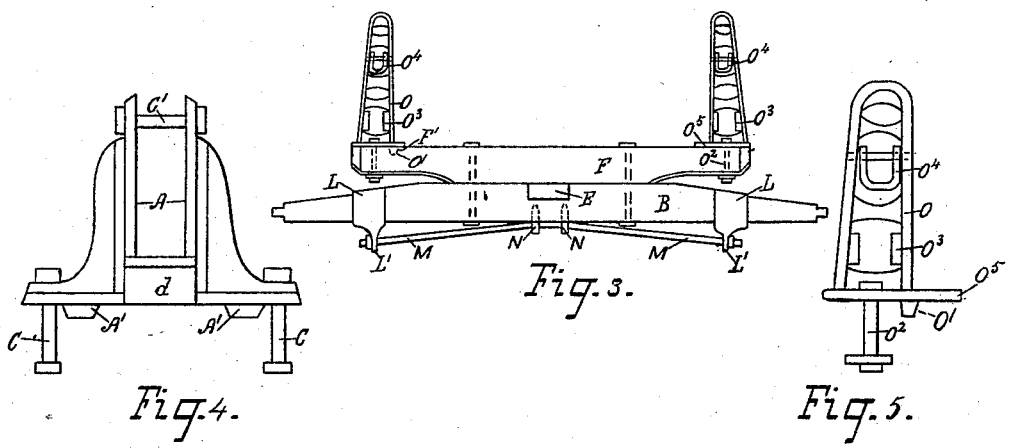
Figure 5:
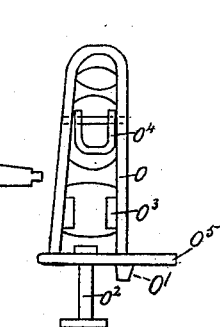

Figure 1 is a side elevation of my invention. Fig. 2 is a top view of same. Fig. 3 is a back end elevation of my invention. Fig. 4 is an enlarged plan view of my improved socket-bracket, showing the tenons and bolts. Fig. 5 is a side elevation of my improved stake, showing the clevis, lugs, tenon, bolts, and flange with which the stake is provided.

A A designate socket-brackets provided with tenons A'.

B B are axles in which the mortises B' are formed.

C C are bolts securing the socket-brackets A A and the axles B B together. As these bolts C C are tightened the tenons A' are inserted and rigidly secured in the mortises B', and the tenons A' on the socket-bracket A being rigidly secured in the mortises B' in the axle B, the side strain and wear are taken off the bolts C C, these bolts C C being for the purpose of holding the socket-bracket and axle together while the wagon is being drawn forward.

C' C' are bolts securing the tongue D to the front socket-bracket and the reach E to the rear socket-bracket, and the vertical sides of the tongue and reach inserted in the socket-brackets are strengthened with flat strips of metal, J J. This reach E is solid, and the front end is rigidly secured to the front bolster F.

G is a brace, one end of which is secured to the reach E. The other end is inserted in a mortise in the front axle, through which brace G the king-bolt H passes as it is pressed down through the bolster F, reach E, sand-board K, and axle B, when connecting them together, but in such a manner as to allow the front axle, which is pivoted on the king-bolt H, to turn off at any desired angle. These socket-brackets may be constructed of malleable iron, cast-iron, or any other material.

L is a skein secured on and near each end of the axles B B. Each of the skeins L L is provided with a lug, L', through which lug L' a slot is cut, and through which slots the ends of the truss-rod M (on which a screw-thread is cut) project. On each of the screw-threaded ends of this truss-rod M, outside the lugs L' L', a nut, e, is screwed; and these nuts e e, binding on the lugs L' L', keep the truss-rod M always braced, and connect the skeins on the same axle together. This truss-rod M is secured to the axle B, about midway between the skeins L L, by staples N N. The advantage of this is, the drop of the truss-rod is at the end of the skein, which gives the greatest strength at the part where the axles usually break.

O is a stake provided with a tenon, O', and two bolts, O², for securing and bracing the stake O on each end of the bolsters F F. The tenon O' fits in mortise F' in the bolster F and secures the stake O in place, and the stake O is further secured by a flange, $O^5$, on which the edge of the wagon-box rests. These stakes O O are provided with lugs $O^3$ and clevis $O^4$, for the purpose of securing a short extension-bar, of wood or other suitable material, to the stake when necessary to extend the said stake. The clevis $O^4$ is extended at right angles to the stake O, and the extension-bar is inserted in said clevis $O^4$ and is pressed down between the lugs $O^3$ $O^3$, which rigidly secure an extension-bar to the stake O, when required.

P is a flat curved spring, one end of which is rigidly secured on the tongue D. The other end passes under a projecting flange or cover, $d$, of the front socket-bracket, A, which holds the tongue D up in a horizontal position about parallel with the ground.

Having thus described my invention, I claim—

The combination of the socket-brackets A A, provided with tenons A' A', axles B B, provided with mortises B' B', bolts C C', bolster F, reach E, king-bolt H, brace G, tongue D, provided with metallic strips J J, spring P, skeins L L, provided with lugs L' L', double truss-rod M, nuts $e$ $e$, staples N N, and stake O, constructed substantially as shown and described, and for the purpose specified.

THOMAS SEAMAN.

Witnesses:
P. J. EDMUNDS,
A. EDMUNDS.